April 22, 1941.   V. B. NORELLI   2,239,338
MOLDING APPARATUS
Filed Nov. 13, 1939
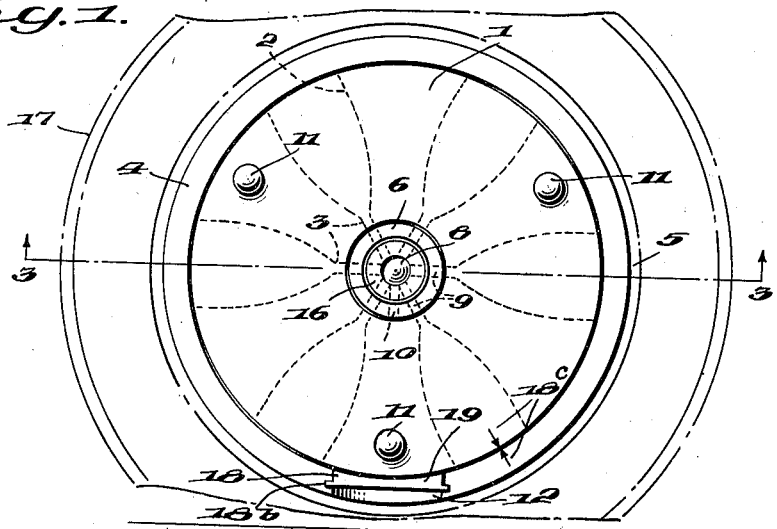
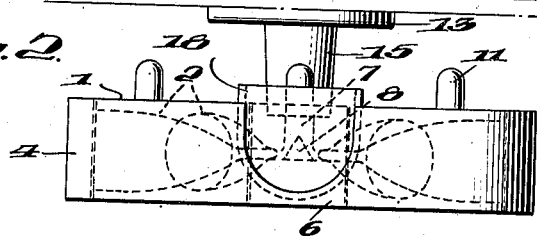
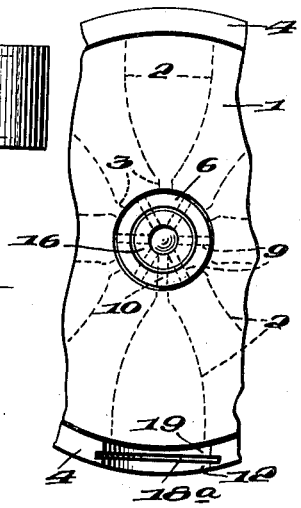
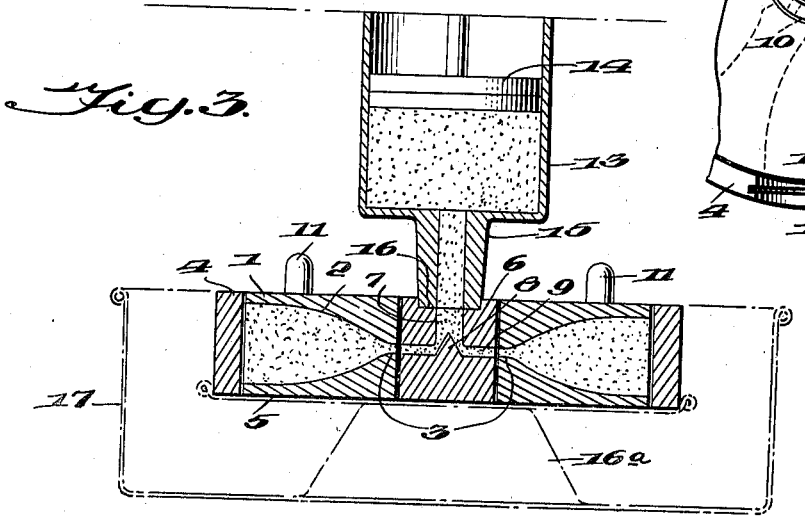
Inventor
Vincent B. Norelli Patented Apr. 22, 1941

2,239,338

UNITED STATES PATENT OFFICE 2,239,338

MOLDING APPARATUS

Vincent B. Norelli, Washington, D. C.

Application November 13, 1939, Serial No. 304,257

6 Claims. (Cl. 18—30)

This invention relates to an apparatus for molding impressionable substances, and particularly to an apparatus for making suppositories and the like.

An object of the invention is to provide an apparatus for simultaneously molding a plurality of articles and for ejecting the articles singly from the mold.

Another object of the invention is to provide an apparatus which not only accomplishes the above-mentioned object but also may be used to form the articles one at a time and to eject them singly from the mold after forming.

Another object of the invention is to provide a machine for making suppositories, the temperature of which machine readily may be controlled and the cleaning of which expeditiously may be performed.

Another object of the invention is to provide a suppository-making machine which may be used to mold all standard forms of suppositories including rectal, vaginal and urethral types.

Further objects and advantages of the invention will be in part apparent and in part pointed out in the following description read in connection with the accompanying drawing in which:

Fig. 1 is a plan view of the apparatus;

Fig. 2 is a front elevation of the same showing an injection cylinder in position;

Fig. 3 is a vertical section of the apparatus taken along the line 3—3 of Fig. 1 looking in the direction of the arrows; and Fig. 4 is a fragmentary plan view of the apparatus showing the mold block in an alternative position from that shown in Fig. 1.

The objects and advantages of the present invention are realized in an apparatus for molding impressionable substances which includes a mold block having a mold cavity therein opening outwardly on one face of the block and having an injection orifice leading into the mold cavity, a housing within which the mold block is movably mounted, said housing having a wall portion provided with a gateway registering with said outwardly opening end of said cavity in one position of said mold block, said wall providing a closure for the end of said cavity in other positions of said mold block, means for moving the mold block relative to said housing, and means for forcing impressionable substance into said mold cavity through said injection orifice.

A temperature regulating means is provided for the apparatus for the purpose of adjusting the mold temperature to that most suitable for molding the particular substance being formed. As shown, this temperature regulating means is a water jacket for maintaining the mold temperature sufficiently low to prevent melting of a suppository mixture being molded in hot surroundings.

The term impressionable substance, as used in the specification and claims, is intended to include plastic substances which are capable of being deformed and caused to flow under pressure at the temperature of molding and which will retain a form imparted to them when the pressure is released. Specific examples of such impressionable substances are cocoa butter and suppository mixtures comprising the same, waxes, and the like.

The invention will be more particularly pointed out by way of example in the following description relating to the drawing which shows a preferred embodiment of the apparatus. This description with the accompanying drawing is to be considered merely as illustrative of the invention and not limitative thereof. For purposes of illustration the apparatus will be described in connection with the molding of suppositories.

In the drawing, 1 represents the mold block having the form of an annular right cylinder having mold cavities 2, which are shaped to produce a suppository, for example, a rectal suppository. The cavity form is generally conical, the base of the cone lying in the outer peripheral surface of the mold block to provide a discharge opening for the mold cavity. From the apex of the conical cavity an injection orifice 3 communicates with the inner peripheral surface or bore of the mold block. The cavities are filled through these injection orifices.

A housing is provided for the mold block comprising a cylindrical outer wall 4, a discoid base plate 5, and a cylindrical inner wall 6. This inner wall provides a tube-like injection header having a space 7 into which the substance being molded is forced under pressure. A conical insert 8 is positioned in the injection header, as shown, and this insert provides a bottom for the header and serves to direct the impressionable substance being molded into the injection holes 9 and to decrease the size of the free space 7 to minimize machine losses of the moldable substance. The injection holes 9 are so placed in the header that they align each with one of the injection orifices 3 when the mold block is in the position indicated in Figs. 1, 2 and 3. An ejector hole 10 is bored through the header wall 6 to be in register with the injection orifice of a mold cavity when the block is in position to eject a suppository therefrom as shown in Fig. 4.

The mold block is rotatable within its housing, and any suitable means may be provided for rotating the same as exemplified by lugs 11 which may be engaged by the hand of an operator or by a suitable handle (not shown) for the purpose of rotating the block.

When the mold block is in the position shown in Fig. 4, one of the mold cavities is aligned with the gateway 12 in the outer wall of the housing, and its injection orifice is in register with ejector hole 10. The injection orifices of all the other cavities are blanked off against solid portions of the tube 6 so that pressure applied to a body of impressionable material in this header forces some of the material through holes 10 and 3 to eject the suppository from the cavity 2.

Means for forcing impressionable substance into the header 6 is shown in the drawing as a gun comprising a cylinder 13, a coacting piston 14, and a nozzle 15. The nozzle engages a shoulder 16 recessed in the top of the header. A close machined fit is provided to insure against leakage of the substance being molded. The means for forcing the impressionable substance into the header specifically forms no part of the present invention, and any other suitable means may be employed.

The housing for the mold cylinder rests upon a pedestal 16a in a container 17. The container may be filled with cold water on warm days to maintain the temperature of the mold below the temperature at which the suppository mixture becomes too soft properly to be worked. The container forms in effect a water jacket for controlling the temperature of the mold. For molding other than suppository mixtures an appropriate temperature regulating means is provided for either heating or cooling the mold as conditions demand.

A brief description of the method of operating the apparatus applied to molding suppositories will now be given.

The gun is filled with at least a little more than sufficient cocoa butter suppository mixture to fill all the mold cavities. The nozzle of the gun is placed against the shoulder 16 of the injection header and the mold block is placed in the position shown in Fig. 1. To find this position, suitably placed fiducial and index markings 18c on the top of the header wall 4 and the mold block 1, respectively, are brought into alignment. It will be noted that, in this position, the ejector hole 10 is blanked off by a solid part of the bore of the mold block, and no suppository mixture can escape through the hole. The piston of the gun is depressed and the mixture being molded is forced into the header space 7, and thence through holes 9 and 3 into the mold cavities to fill the same. The fit between the surfaces of the mold block and the corresponding surfaces of the housing is made sufficiently loose that air can escape through the joint, but not so loose that the mixture being molded, which is much more viscous than air, can pass therethrough under ordinary conditions of operation. Thus the mold cavities do not become air-bound and it is unnecessary to provide vents.

After the cavities have been filled, the block is rotated to bring one of the cavities into alignment with the gateway as shown in Fig. 4. A slight additional pressure applied by the gun will then eject the molded suppository from its cavity. The suppository, as ejected, has a tail-like sprue attached to its apex which has formed during the ejection operation. This sprue is broken off by the operator as a finishing operation. The next mold cavity is brought into alignment with the gateway and its suppository is similarly ejected. Each of the cavities may be emptied in the same way.

With the apparatus, suppositories may be molded singly by providing a closure or gate 18 for the gateway 12. This gate is furnished with a tongue 18b for engagement with the groove 18a in the gateway. The gate is dropped into the gateway from above and will be retained in place by engagement of the tongue in the groove. The surface 19 of the gate contacting the outer peripheral surface of the mold block is made with a curve corresponding to the curve of the mold block so that a tight joint is produced which will prevent escape of moldable substance from the mold cavity during the forming operation.

For making suppositories singly, the mold block is positioned as shown in Fig. 4 and is not thereafter moved. The gate is inserted and the mold cavity is filled as explained; but in this case, hole 10 performs the function of both an injector and an ejector hole. After filling the cavity, the gate is removed and the suppository ejected by a slight additional pressure from the gun. The cycle may be repeated as desired.

The positioning of the mold block, as shown in Fig. 4, leaves only the front cavity in communication with the header space 7. The injection orifices of the other cavities are closed to the header space by wall 6, and these cavities are inoperative when suppositories are cast one at a time.

Alternative mold blocks having cavities of various sizes and shapes may be used with any one housing for the production of various articles. The number of mold cavities in the block may be greater or smaller than the convenient number six illustrated.

Urethral suppositories may be extruded to any desired length by using a mold block having a tube-like passage bored radially through the block. The tube-like passage is positioned to be aligned between ejector hole 10 and gateway 12. With such a block, a rod of material may be extruded from the apparatus and cut into lengths appropriate for urethral suppositories. The diameter of the suppository will be determined by the diameter of the tube-like passage.

It will be seen that when a plurality of suppositories are simultaneously made in the apparatus of the present invention by one stroke of a piston, the suppositories are formed under conditions of equal pressure and temperature and great uniformity is thus achieved.

I claim:

1. An apparatus for molding impressionable substances which comprises a mold block comprising a solid of rotation, a bore in said block concentric with the axis of symmetry thereof, a mold cavity in said block having a mold discharge opening terminating in an outer surface of the block for the removal of articles from the cavity, an injection orifice leading from the bore of said block to said mold cavity, a housing for said block in which the latter is rotatable, a gateway in said housing located to register with the mold discharge opening for one position of the block within the housing, the wall of said housing serving as a closure for said cavity opening for all positions of the block within the housing in which said cavity opening is out of register with said gateway, an injection header within the bore of said block forming an inner wall of the housing for the block and having an outer surface complementary to said bore, a hole through the wall of the injection header positioned to be aligned with the injection orifice leading to the mold cavity when the cavity opening is in a position out of alignment with said gateway, a second hole through the wall of said injection header positioned to be aligned with the injection orifice leading to the mold cavity when the cavity opening is aligned with said gateway, means for forcing impressionable substance into said injection header, and means for rotating said block within its housing.

2. An apparatus for molding impressionable substances which comprises a mold block comprising an annular right cylinder having an outer peripheral surface and an inner peripheral surface providing a central bore, a plurality of mold cavities within said mold block, each of said mold cavities having a discharge opening terminating in the outer peripheral surface of the block, said discharge openings being centered substantially in a plane at right angles to the axis of the cylindrical mold block, each of said mold cavities being further provided with an injection orifice opening into the central bore of the mold block, said injection orifices being centered substantially in a plane at right angles to the axis of the cylindrical mold block, a housing for said mold block including an outer cylindrical wall engaging the outer peripheral surface of the mold block and an inner cylindrical wall providing an injection header engaging the central bore of the mold block, said mold block being rotatable within its housing, a number of injection holes in the injection header corresponding to the number of injection orifices, each hole positioned to align with an injection orifice and communicate with one of the mold cavities when the mold block is in a predetermined position of rotation with respect to its housing, in which predetermined position each of the mold cavity discharge openings is closed by the outer cylindrical wall of the housing, a gateway in the outer cylindrical wall of the housing positioned to be aligned successively with each mold cavity discharge opening upon rotation of the mold block within its housing, an ejector hole in the injection header positioned to register with the injection orifice of a mold cavity positioned with its discharge opening in alignment with said gateway, means for forcing impressionable substance into said injection header, and means for rotating the mold block within its housing.

3. An apparatus for molding impressionable substances which comprises a mold block housing including an outer wall and an inner wall, a mold block disposed between said walls and making sliding contact therewith, a mold cavity in said block and an opening in the surface of said block adjacent the outer wall of the housing for discharging a molded article from said cavity, said mold block further having an injection orifice forming a passage from the surface of the mold block adjacent said inner wall of said housing to said mold cavity, the outer wall of said housing having a gateway with which said mold cavity discharge opening is registrable and the inner wall of said housing having a confined space for the reception of impressionable substance and having a passage from said confined space to the surface of said inner wall adjacent said mold block, said latter passage registering with said mold cavity injection orifice when said mold cavity discharge opening is in register with said gateway, said inner wall further having a second passage from said confined space to the surface of said inner wall adjacent said mold block, which second passage is registrable with said mold cavity injection orifice when said mold block is positioned so that said mold cavity discharge opening is closed by said outer wall of said housing, means for forcing impressionable substance into said confined space, and means for sliding said mold block between said housing walls.

4. The combination with an apparatus as defined in claim 3 of a closure for said gateway, said gateway closure having an inner surface of the same curvature as the surface of the mold block adjacent thereto.

5. An apparatus for molding impressionable substances which comprises a mold block housing including an annular cylindrical outer wall and an inner wall concentric therewith, an annular cylindrical mold block disposed between said walls and making sliding contact therewith, said block having a mold cavity therein and having an opening in the surface of the mold block adjacent said outer wall of said housing for discharging a molded article from said cavity and further having an injection orifice forming a passage from the surface of the mold block adjacent said inner wall of said housing to said mold cavity, the outer wall of said housing having a gateway with which said mold cavity discharge opening is registrable and the inner wall of said housing having a confined space for the reception of impressionable substance and having a passage from said confined space to the surface of said inner wall adjacent said mold block, said passage registering with said mold cavity injection orifice when said mold cavity discharge opening is in register with said gateway, said inner wall further having a second passage from said confined space to the surface of said inner wall adjacent said mold block, which second passage is registrable with said mold cavity injection orifice when said mold block is positioned so that said mold cavity discharge opening is closed by said outer wall of said housing, means for forcing impressionable substance into said confined space, and means for moving said mold block between said housing walls.

6. An apparatus as defined in claim 5 and having a water jacket surrounding the outer wall of said annular cylindrical mold block housing.

VINCENT B. NORELLI.